United States Patent
Shodhan

(10) Patent No.: US 9,248,351 B1
(45) Date of Patent: Feb. 2, 2016

(54) DEVICE FOR PICKING UP BALLS AND OTHER ITEMS

(71) Applicant: Kuldip C. Shodhan, Newark, CA (US)

(72) Inventor: Kuldip C. Shodhan, Newark, CA (US)

( * ) Notice: Subject to any disclaimer, the term of this patent is extended or adjusted under 35 U.S.C. 154(b) by 0 days.

(21) Appl. No.: 14/670,297

(22) Filed: Mar. 26, 2015

(51) Int. Cl.
 *A63B 47/02* (2006.01)
 *B25J 1/04* (2006.01)

(52) U.S. Cl.
 CPC ... *A63B 47/02* (2013.01); *B25J 1/04* (2013.01)

(58) Field of Classification Search
 CPC ............ B25J 1/04; A63B 57/00; A63B 47/00
 USPC .................. 294/19.2; 473/286; 56/328.1, 332
 See application file for complete search history.

(56) References Cited

U.S. PATENT DOCUMENTS

| | | | | |
|---|---|---|---|---|
| 698,226 | A * | 4/1902 | Roberts .................. | A63B 47/02 294/19.2 |
| 713,672 | A * | 11/1902 | Oliver .................... | A63B 47/02 294/19.2 |
| 771,886 | A * | 10/1904 | Smith .................... | A63B 47/02 294/19.2 |
| 1,459,389 | A * | 6/1923 | Brown ................... | A63B 47/02 124/5 |
| 3,258,286 | A | 6/1966 | Coward | |
| 3,316,008 | A | 4/1967 | Baugh, Jr. | |
| 3,957,297 | A | 5/1976 | Hanks | |
| 4,058,336 | A | 11/1977 | Parkinson | |
| 4,063,769 | A | 12/1977 | Zimmer | |
| 4,180,288 | A * | 12/1979 | Sievers .................. | A63B 47/02 294/19.2 |
| 4,334,707 | A | 6/1982 | Phillips | |
| 4,643,472 | A | 2/1987 | Schukei et al. | |
| 4,848,071 | A * | 7/1989 | Laughlin ................ | A01D 51/00 294/19.2 |
| 4,964,665 | A * | 10/1990 | Crow ................... | A01D 51/002 294/19.2 |
| 5,147,101 | A | 9/1992 | Tiller | |
| 5,292,161 | A * | 3/1994 | Green .................... | A63B 47/02 206/315.9 |
| 5,395,146 | A | 3/1995 | Liu et al. | |
| 5,669,646 | A | 9/1997 | Fiocca et al. | |
| 6,386,607 | B1 * | 5/2002 | Deininger .............. | A63B 47/02 221/194 |
| 6,619,022 | B2 * | 9/2003 | Edwards .............. | A01D 51/002 294/19.2 |

(Continued)

FOREIGN PATENT DOCUMENTS

| | | | | |
|---|---|---|---|---|
| CA | 2427694 | A1 * | 11/2004 | ............. A63B 47/02 |
| FR | 1506471 | A * | 12/1967 | ............. A63B 47/02 |

(Continued)

OTHER PUBLICATIONS

After school.com, Unique tennis ball pick-up 21, tennis ball picker, Aug. 10, 2012, 4 pages, www.Afterschool.com/Amazon, US.

(Continued)

*Primary Examiner* — Gabriela Puig
(74) *Attorney, Agent, or Firm* — IDP Patent Services; Olav M. Underdal

(57) ABSTRACT

A pick-up device for picking up balls and other objects, includes an elongated hollow ball container, including an extension section and an attachment unit, which includes a ball valve mechanism, which can include plurality of elastic strings, or springs, configured in a cross-over pattern, such that a user can hold the pick-up device and press the ball valve mechanism onto a ball, such that the ball passes the ball valve mechanism, and is stored inside the elongated hollow ball container. The ball valve mechanism can alternatively include two springs mounted in slots on opposing sides of a lower end of the ball container; or an elastic string, which is woven in a horizontal/vertical interlacing pattern. The pick-up device can be tubular and made from a plastic material.

6 Claims, 9 Drawing Sheets

(56) References Cited

U.S. PATENT DOCUMENTS

| | | |
|---|---|---|
| 6,824,179 B1 | 11/2004 | Shelato |
| 7,165,796 B1 | 1/2007 | Hung |
| 7,309,293 B2 | 12/2007 | Dunks |
| 7,866,719 B1 * | 1/2011 | Lucca .................... A63B 47/02 294/19.2 |
| 7,922,608 B1 | 4/2011 | Shoham |
| 7,951,014 B2 | 5/2011 | Nickel |
| 8,353,790 B1 | 1/2013 | Kilfeather |
| 8,523,699 B2 | 9/2013 | Bennett |
| 8,534,726 B2 * | 9/2013 | Bulatao ................ A63B 47/002 294/19.2 |
| 2002/0151390 A1 * | 10/2002 | Niksich .................. A63B 47/02 473/460 |

FOREIGN PATENT DOCUMENTS

| | | | | |
|---|---|---|---|---|
| FR | 2454820 A1 * | 11/1980 | ............. | A63B 47/02 |
| FR | 2873588 A1 * | 2/2006 | ............. | A63B 47/02 |

OTHER PUBLICATIONS

Gregg Letts, Newgy Pong Pal Review, Aug. 27, 2012, 2 pages, www.About.com, US.

* cited by examiner

DEVICE FOR PICKING UP BALLS AND OTHER ITEMS

CROSS-REFERENCE TO RELATED APPLICATIONS

N/A

FIELD OF THE INVENTION

The present invention relates generally to the field of devices for picking up items from the ground, and more particularly to versatile low-cost mechanical devices for selectively picking up balls and other items of a particular predetermined size.

BACKGROUND OF THE INVENTION

In circumstances where large numbers of balls need to be picked up, as for example during golf or tennis or baseball practice, the task of picking up the balls can be tedious and laborious and generally will require constant bending down, which can cause back strain. Ball pick up devices are already known but the known devices have a number of shortcomings.

Existing devices on the market are either very complicated and thereby costly, or they are very simple string based devices, which do not provide adequate strength to retain a large plurality of balls, which thereby can be permitted to escape unintentionally from an inlet opening. Additionally, due to the inadequate strength, these existing devices have limited capacity.

As such, considering the foregoing, it may be appreciated that there continues to be a need for novel and improved devices and methods for low-cost devices designed for picking up balls and other objects.

SUMMARY OF THE INVENTION

The foregoing needs are met, to a great extent, by the present invention, wherein in aspects of this invention, enhancements are provided to the existing models of devices for picking up balls and other items.

In various aspects, the present invention improves the pre-existing ball retrieval devices by use of a simplified mechanical device having a very powerful immediate commercial application in picking up different balls in different sports. This helps in saving back trouble, giving more time to play, allowing more cost-efficient use of sporting premises, and may aid in developing playing skills faster.

In various aspects, the present invention is economic and easy to manufacture in all its embodiments, is durable, can perform the function of picking up balls without the need for a multiplicity of parts to comprise a mechanism to perform the functions of picking up and holding balls. Its performance is not susceptible to a reduction in elasticity of an elasticized member causing a loss of effectiveness such as occurs with those which are used in the cited inventions. Furthermore, the various aspects of the present invention do not rely on an elasticized member, which must be set at a critical diameter relative to the diameter of the ball to be picked up.

In an aspect, a pick-up device for picking up balls and other objects can include an elongated hollow ball container; and a ball valve mechanism, which is mounted in a lower opening of the elongated ball container, wherein the ball valve mechanism comprises a plurality of elastic strings, which can include elastic cords and springs, such that the strings are configured in a cross-over pattern, such that a first end of any one string is behind, a second end of a preceding string, and a second end of the any one string is in front of a first end of a succeeding string. A user holds the elongated hollow ball container in an upper end of the elongated hollow ball container, and picks up a ball on the ground, by directing the lower end of the elongated hollow ball container in the direction of the ball, such that the ball valve mechanism is pressed onto the ball and allows the ball to pass through the ball valve mechanism, such that the ball is stored inside the ball container, along with other balls that have been picked up.

In another aspect, the ball valve mechanism can include two elastic strings, including elastic cords and springs, mounted in slots on opposing sides of a lower end of the ball container, such that each string is attached to both ends of a slot, such that the two strings flex into the slots, when the ball valve mechanism is pressed onto a ball.

In yet another aspect, the ball valve mechanism can include an elastic string, which is woven in a horizontal/vertical interlacing pattern formed by horizontal and vertical string segments, which are formed by the string being run through a pattern, which follows four times n holes in a lower end of the elongated ball container, where n is two or larger, such that the string first tracks horizontal lines, from side to side, and then tracks vertical lines, between a top and bottom, such that the string shifts from crossing under and over the horizontal lines, thereby forming a horizontal/vertical interlacing pattern.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

Figure 1:
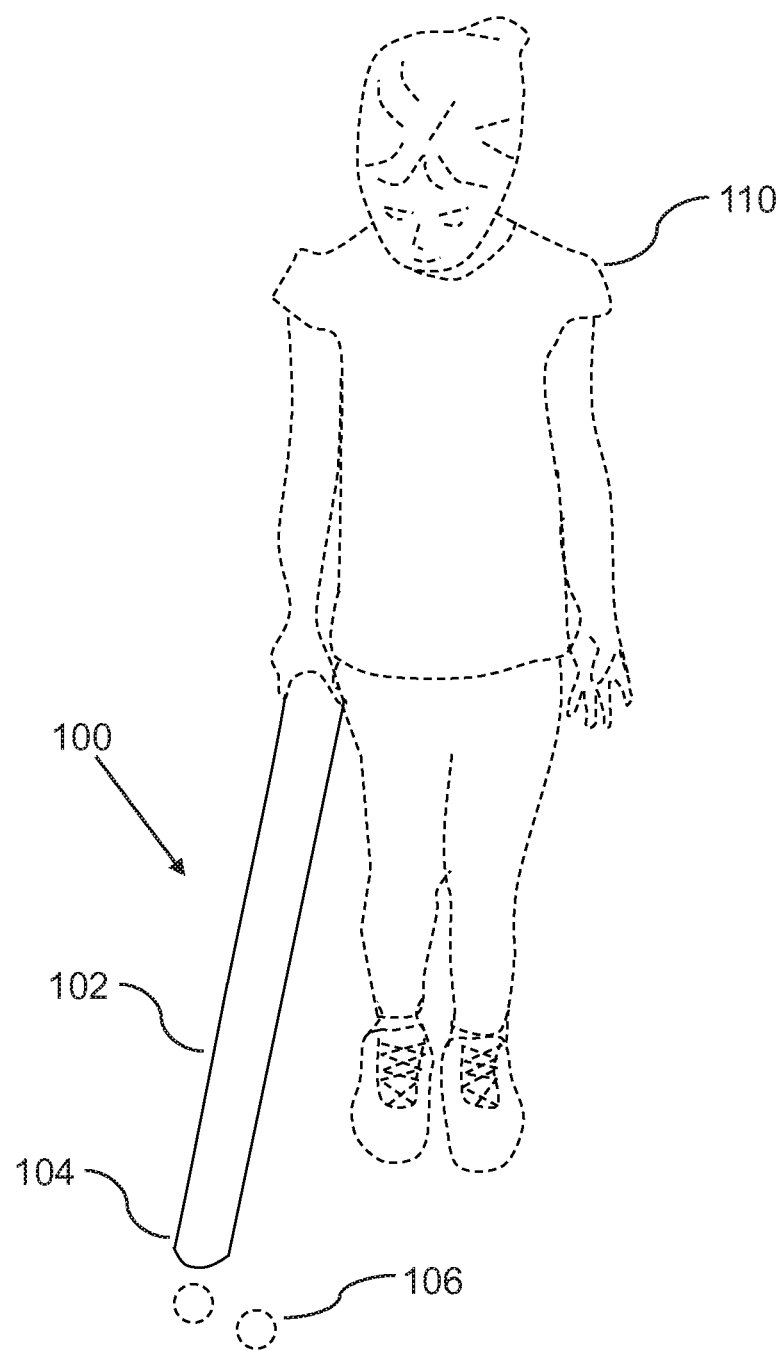
FIG. 1 is a perspective view of a ball pick up device during use, according to an embodiment of the invention.

In the following, we describe the structure of an embodiment of a ball pick up device 100 with reference to FIG. 1, in such manner that like reference numerals refer to like components throughout; a convention that we shall employ for the remainder of this specification.

A ball pick up device 100, can include an elongated hollow ball container 102, and a ball valve mechanism 104 mounted in a lower opening of the elongated ball container 102, such that a user 110 can hold the ball pick up device 100 in an upper end of the elongated hollow ball container 102, and pick up a ball 106 on the ground, by directing the lower end of the elongated hollow ball container 102 in the direction of the ball, such that the ball valve mechanism 104 can be pressed onto the ball 106 and allow the ball 106 to pass through the ball valve mechanism 104, such that the ball 106 is stored inside the ball container 102, along with other balls 106 that have been picked up.

Figure 2:
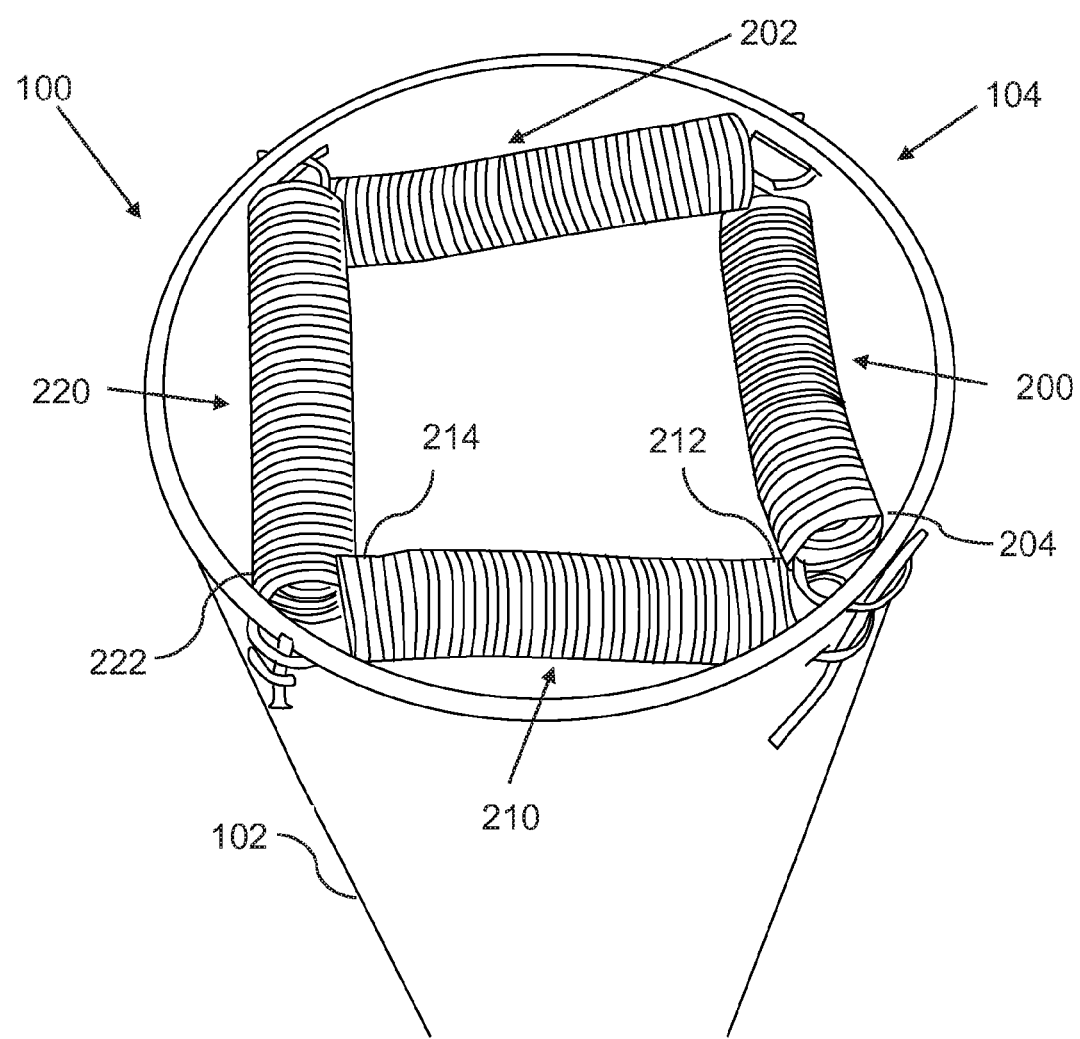
FIG. 2 is a perspective view of a lower end of a ball pickup device, showing a ball valve mechanism, according to an embodiment of the invention.

In a related embodiment, as shown in FIG. 2, a ball valve mechanism 104 can comprise a plurality of strings 202, wherein each string 202 200 210 220 is connected to an inner side of ball container 102, such that for each string 202 200 210 220, a first end is mounted further from the lower opening of the ball container 102, and a second end is mounted closer to the lower opening, such that the strings are configured in a cross-over pattern, such that when viewed in clockwise direction, as viewed from the bottom of the ball pick up device 100, a first end 212 of any one string 210 is behind, a second end 204 of a preceding string 200, and a second end 214 of the any one string is in front of a first end 222 of a succeeding string 220.

Figure 3:
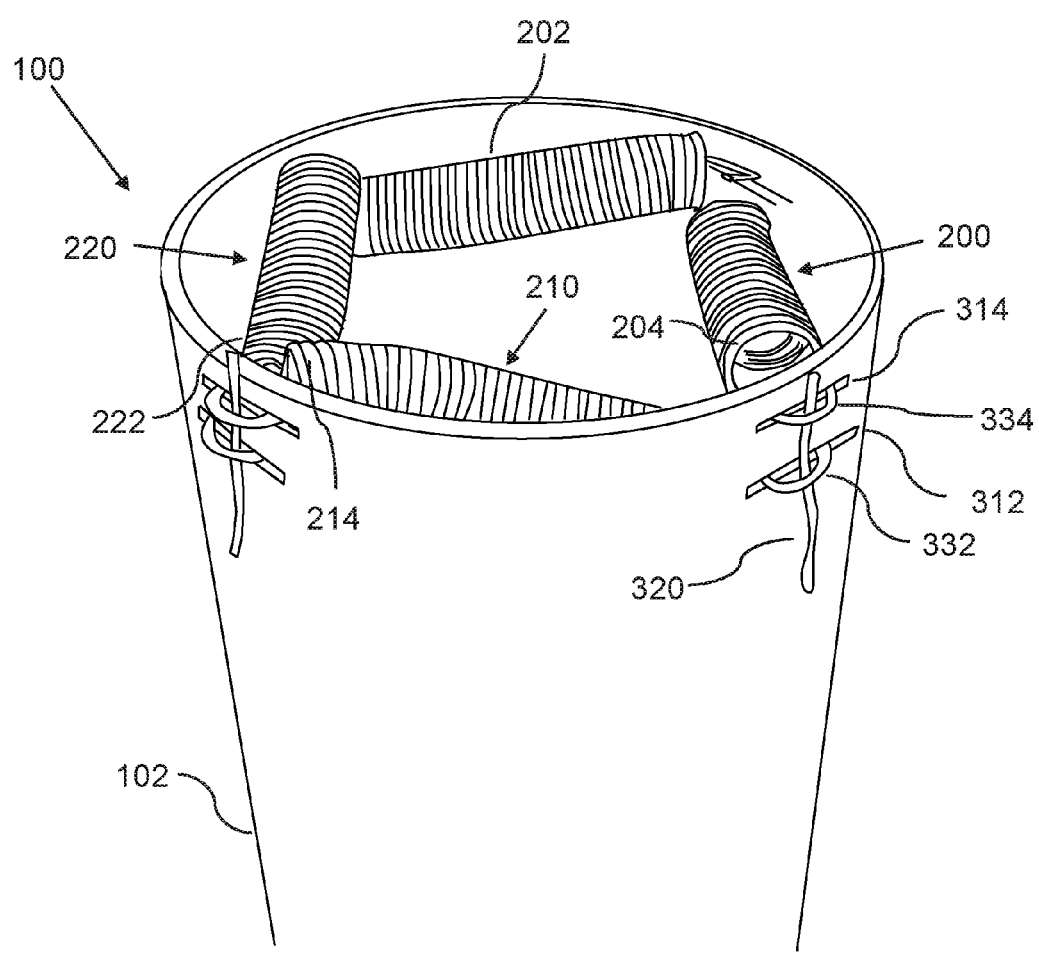
FIG. 3 is a perspective view of a lower end of a ball pickup device, showing a ball valve mechanism, according to an embodiment of the invention.

In related embodiment, the strings 202 200 210 220 can include elastic cords and springs. FIGS. 2 and 3 show an embodiment using springs. The elastic cords can include various types of cords used for bungee jumping, and various kinds of cords used for strapping purposes.

FIG. 3 shows a lower perspective side view of the embodiment shown in FIG. 2, which illustrates that ends of the strings 202 200 210 220 are connected to the inner side of the ball container 102, by insertion of a hook of the ends into slots, which penetrate the ball container, such that a pin or cable is inserted under the hook, on an outer side of the slot, perpendicular to the elongated direction of the slot, whereby the hook is fastened in place around the pin, whereby the end of the spring is fastened in place. A first end hook 332 can be inserted into a lower slot 312, and a second end hook 334 can be inserted into an upper slot 314, such that the first and second end hooks 332 334 are held in place by a pin 320, or by separate pins.

Figure 4:
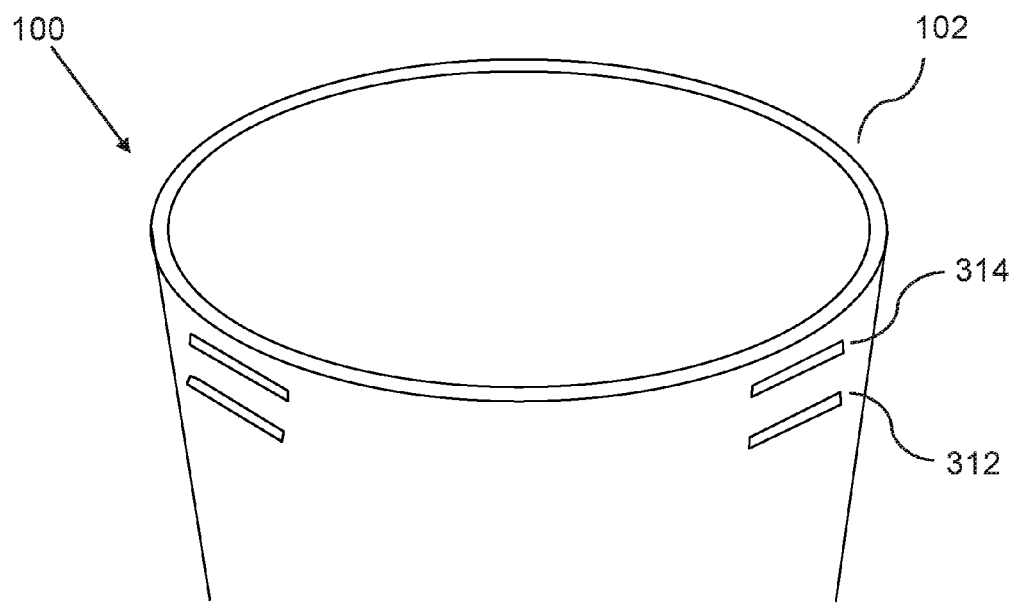
FIG. 4 is a perspective view of a lower end of a ball container, without a ball valve mechanism installed, according to an embodiment of the invention.

FIG. 4 shows a lower perspective side view of the embodiment shown in FIG. 2, showing only the lower end of the ball container 102, with upper and lower slots, without springs installed.

Figure 5:
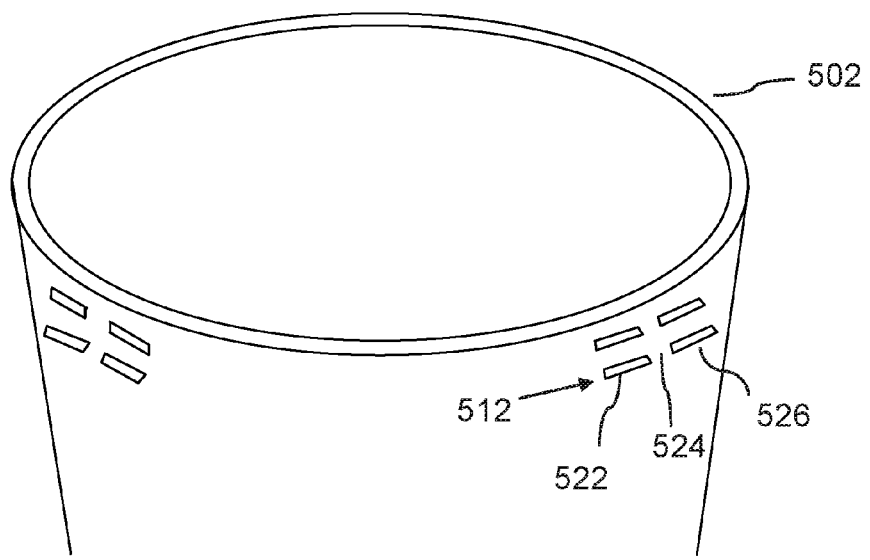
FIG. 5 is a perspective view of a lower end of a ball container, without a ball valve mechanism installed, according to an embodiment of the invention.

In a related embodiment, FIG. 5 shows a lower perspective side view of a lower end of a ball container 502, with upper and lower slots, wherein each slot 512 is comprised of two openings 522 526 with a bridge 524 in between, such that a hook 332 of a spring can be attached to the bridge, whereby the pin 320 is not needed to secure an end of a spring in place.

Figure 6:
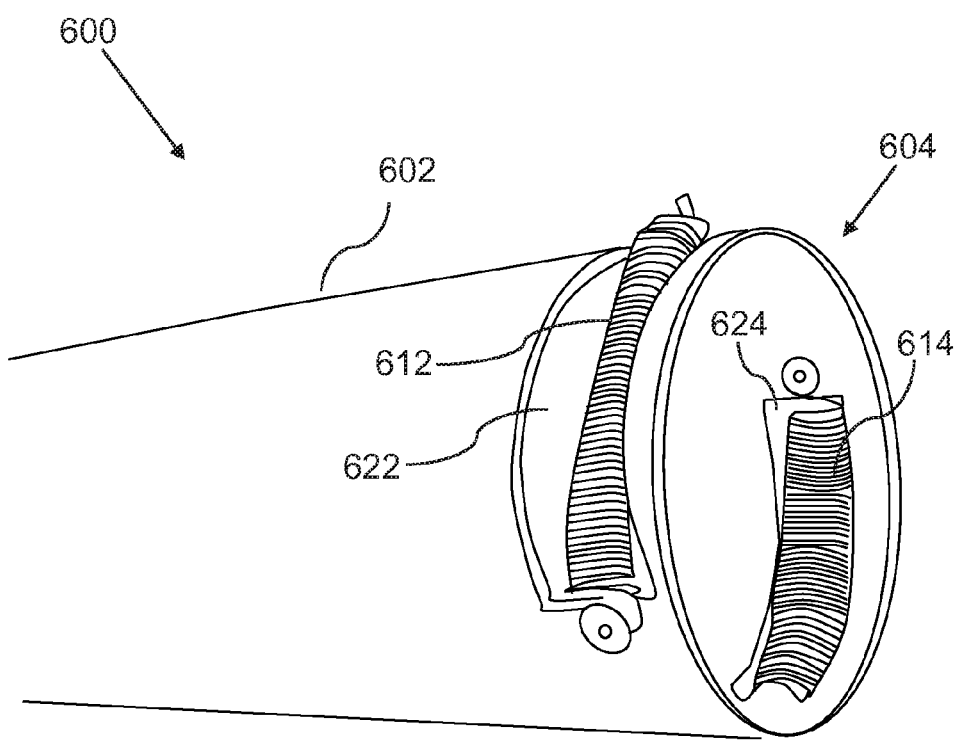
FIG. 6 is a perspective view of a lower end of a ball pickup device, showing a ball valve mechanism, according to an embodiment of the invention.

In another embodiment, shown in FIG. 6, two elastic cords or springs 612 614 can be mounted on opposing sides of the lower end of a ball container 602, in slots 622 624, such that each spring 612 614 is attached to both ends of a slot 622 624, such that the two springs 612 614 function as a ball valve mechanism 604, wherein the springs 612 614 can flex into the slots 622 624 when the ball valve mechanism 604 is pressed onto a ball, whereby the ball valve mechanism 604 allows the ball to pass through the ball valve mechanism 604, such that the ball is stored inside the ball container 602, along with other balls that have been picked up.

In a related embodiment, the elastic cords or springs 612 614 can for example be attached with rivets, as shown. Alternatively, the elastic cords or springs 612 614 can be attached with nuts and bolts, which thereby can facility replacement of the elastic cords or springs 612.

Figure 7:
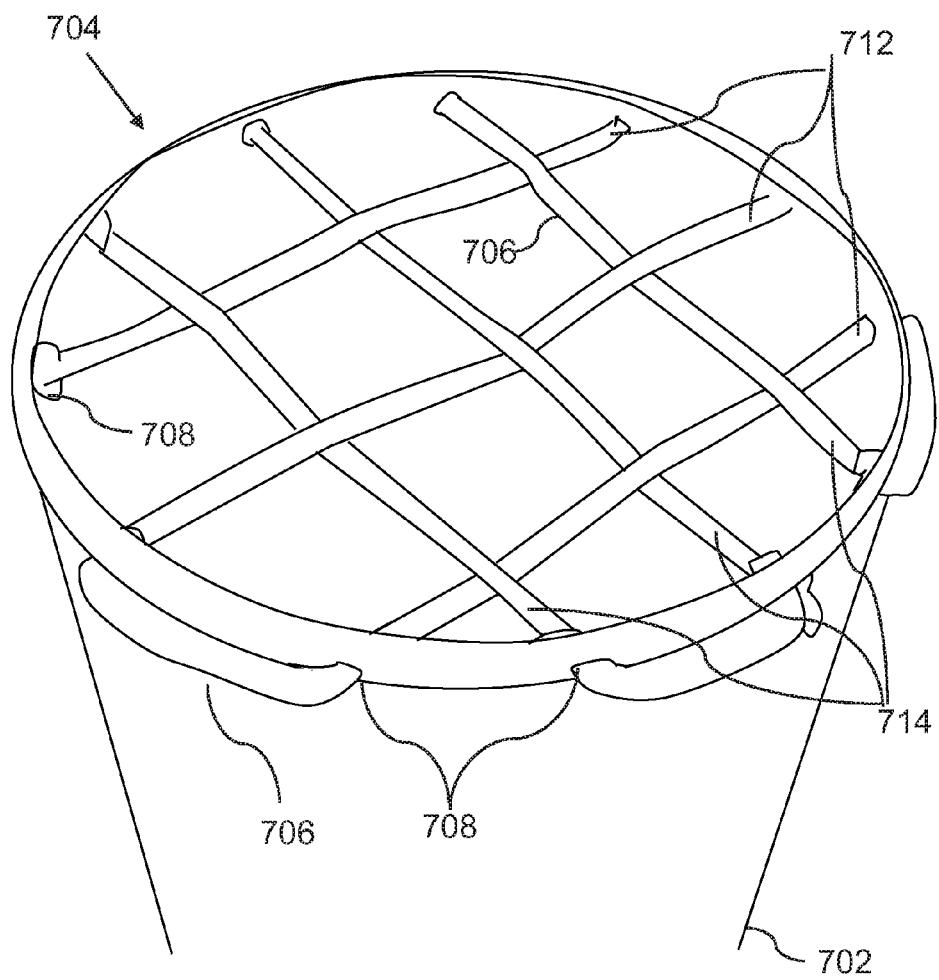
FIG. 7 is a perspective view of a lower end of a ball pickup device, showing a ball valve mechanism, according to an embodiment of the invention.

In yet another embodiment, as shown in FIG. 7, an elastic cord 706 can be woven in an horizontal/vertical interlacing pattern formed by horizontal 712 and vertical 714 string segments, which are formed by the string being run through a pattern which follows 4 times n equidistant holes 708 in the lower end of the elongated ball container 702, where n is equal or greater than 2 or larger, here shown with n=3, such that there are 12 equidistant holes 708, such that the string first tracks horizontal lines 712, from side to side, and then tracks vertical lines 714, between a top and bottom, such that the string shift from crossing under and over the horizontal lines, such that the horizontal 712 and vertical 714 string segments are perpendicular, thereby forming a horizontal/vertical interlacing pattern.

The horizontal/vertical interlacing pattern of the elastic cord 706 functions as a ball valve mechanism 704, wherein the horizontal and vertical rings can flex when the ball valve mechanism 704 is pressed onto a ball, whereby the ball valve mechanism 704 allows the ball to pass through the ball valve mechanism 704, such that the ball is stored inside the ball container 702, along with other balls that have been picked up.

The ball valve mechanism 704, is particularly well suited for picking up balls that are relatively small compared to the diameter of the ball container 702, such as for example golf balls, when used with a 4" diameter ball container 702.

Figure 10:
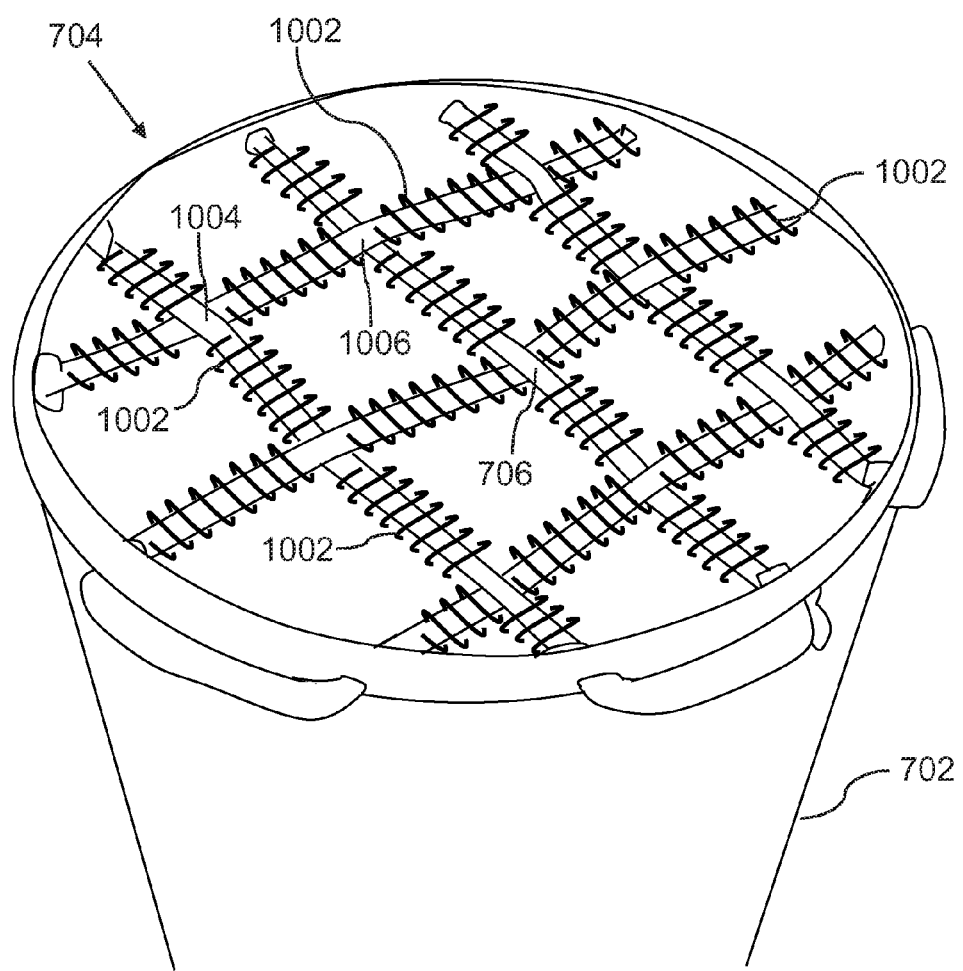
FIG. 10 is a perspective view of a lower end of a ball pickup device, showing a ball valve mechanism, according to an embodiment of the invention.

In a further related embodiment, as shown in FIG. 10, in order to protect the elastic cord 706, thereby increasing the durability of the elastic cord 706, the ball valve mechanism 704, can further include a plurality of springs 1002, which can be made of plastic or metal, such that each spring 1002 is installed in a segment of the elastic cord 706, between adjacent crossing points 1004 1006 of the horizontal and vertical cord segments 712 714, and between crossing points 1004 and the elongated ball container 702.

Figure 8:
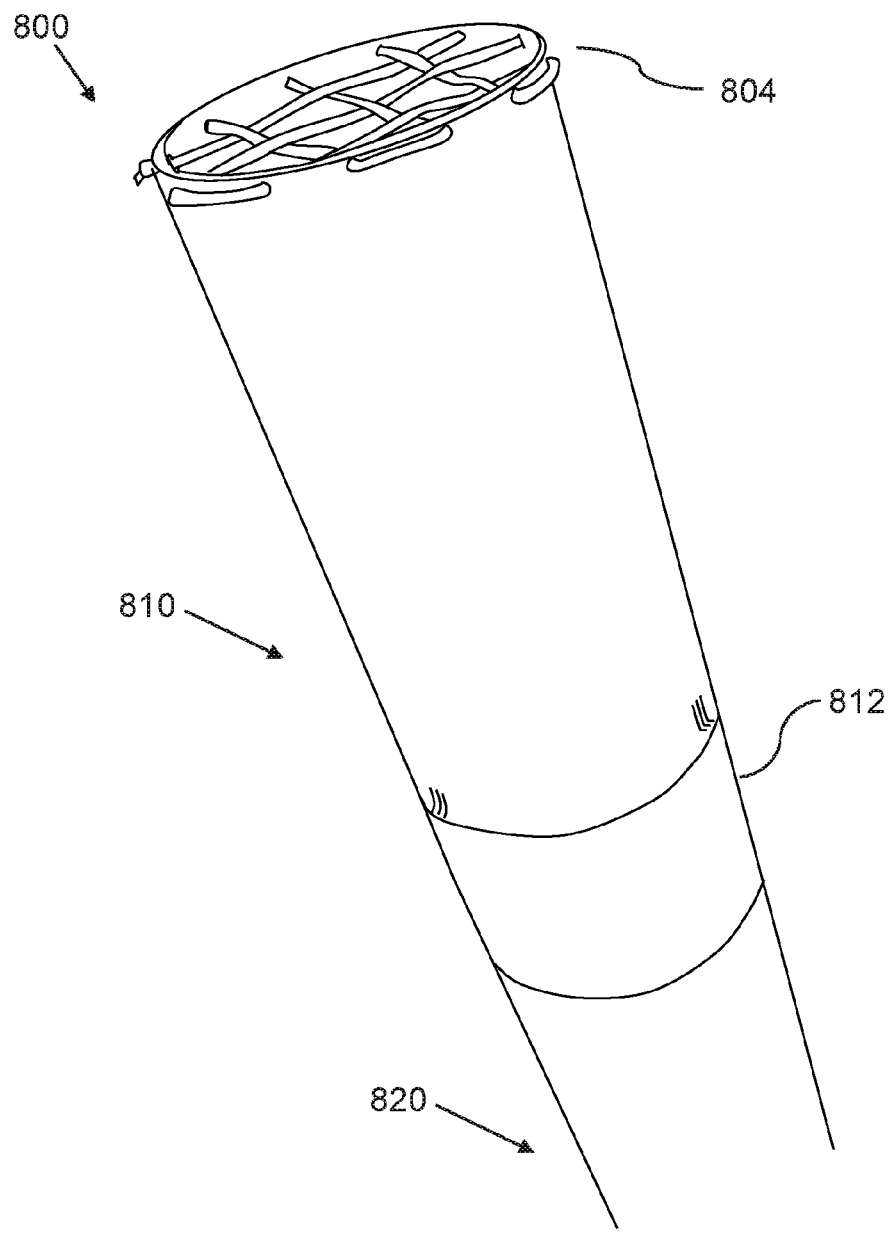
FIG. 8 is a perspective view of a lower end of a ball pickup device, showing an attachment unit connected to an extension section, according to an embodiment of the invention.

In an embodiment, as shown in FIG. 8, an elongated ball container, can further include:
 a. An attachment unit 810, which can further include:
  i. A ball valve mechanism 804, mounted in a lower opening of the attachment unit;
  ii. A widening section 812, at an upper end of the attachment unit 810, such that the widening section 812, has a greater diameter than the general diameter of the lower end of the attachment unit 810;
 b. An extension section 820, such that the widening section 812 of the attachment unit 810 is configured to slide onto the lower end of the extension section 820, such that the widening section 812 is firmly secured on the lower end of the extension section 820, which has the substantially equal general diameter as the general diameter of the lower end of the attachment unit 810.

In a related embodiment, the attachment unit 810 can be sold and shipped separately, and combined at a destination location with a standard width extension type, which can be widely available as an off-the-shelf item.

In a related embodiment, an attachment unit 810 can alternatively be made with a uniform diameter from an upper end to a lower end, i.e. without a widening section 812, such that it is configured to slide securely onto an extension section 820 920, which has a smaller uniform diameter.

Figure 9:
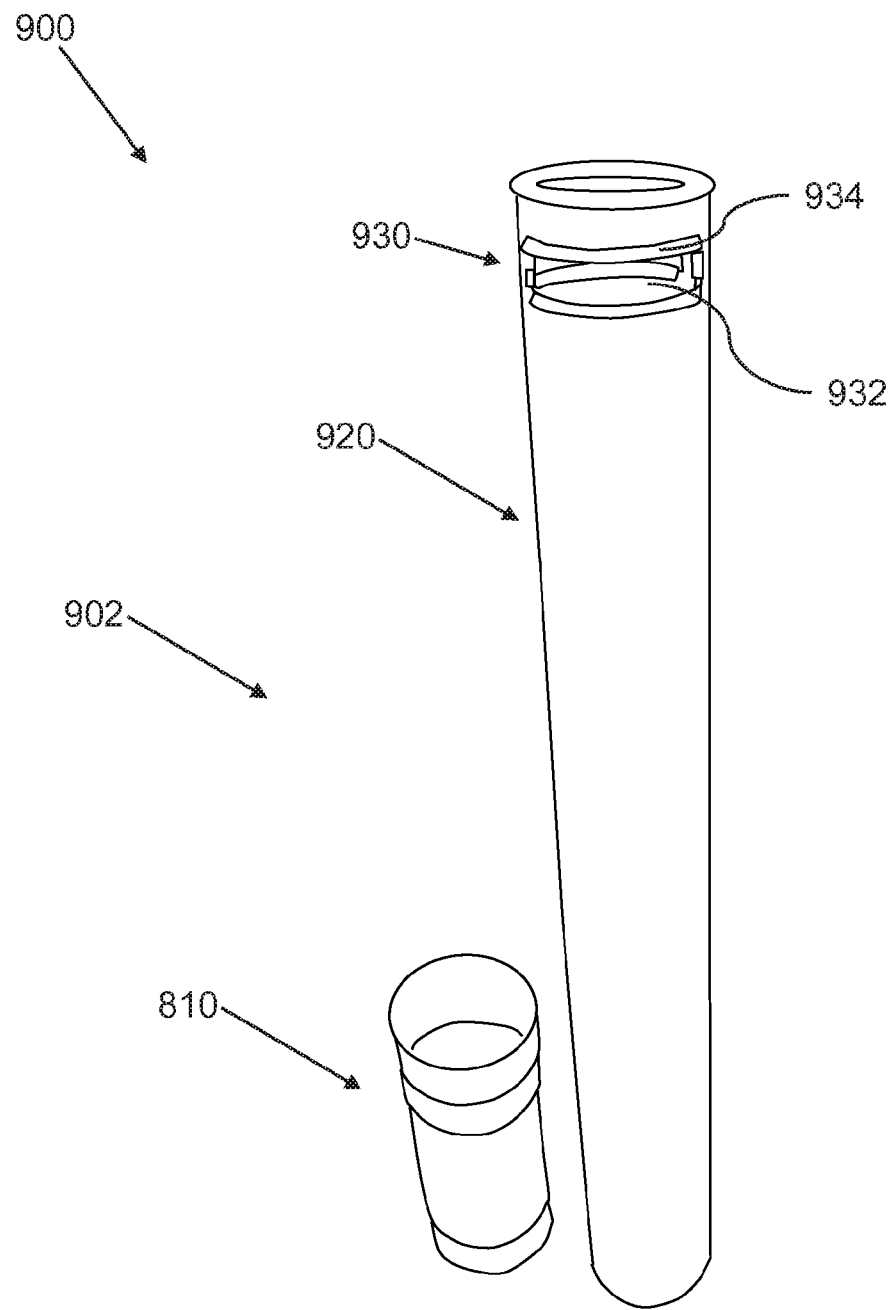
FIG. 9 is a perspective view of ball pickup device, showing an attachment unit disconnected from an extension section, according to an embodiment of the invention.

In a related embodiment of a ball pick up device 900, as shown in FIG. 9, an upper end of an elongated ball container 902 can include a handle 930 for holding on to the elongated ball container. As shown, the handle can be comprised of two openings 932 in opposing sides of an upper end on the elongated ball container. The openings 932 can further be lined with an edge protector 934, for example made from a soft plastic material. As shown, the ball pick up device 900, can be comprised of an attachment unit 810, comprising the ball valve mechanism 804 in a lower end, which is attached to an extension section 920, which contains the handle 930 in an upper end of the extension section 920.

In a related embodiment of a ball pick up device 100 900, the handle 930 can be a part of an upper attachment unit, which can be attached to an upper end of an extension section 920, or an upper end of a ball container 102.

In a related embodiment, the elongated ball container 102 can be tubular.

In a related embodiment, the elongated ball container 102, and/or attachment unit 810, and/or extension section 820 can be perforated, such as with a plurality of holes or slits, in order to reduce weight.

In a related embodiment the elongated ball container 102, can be made from a plastic material, such as acrylonitrile butadiene styrene and polyvinyl chloride, including unplasticized polyvinyl chloride and post chlorinated polyvinyl chloride.

Various embodiments of the pickup device 100 600 800 900 can be used for picking up various objects other than balls, including substantially spherical or ovoid items, or items with a substantially round, substantially regular, or substantially smooth surface.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A pick-up device for picking up balls and other objects, comprising:
 a. an elongated hollow ball container; and
 b. a ball valve mechanism, which is mounted in a lower opening of the elongated ball container, the ball valve mechanism comprising:
  i. an elastic string, which is woven in a horizontal/vertical interlacing pattern formed by horizontal and vertical string segments, which are formed by the string being run through a pattern, which follows four times n holes in a lower end of the elongated ball container, where n is two or larger, such that the string first tracks horizontal lines, from side to side, and then tracks vertical lines, between a top and bottom, such that the string shifts from crossing under and over the horizontal lines, thereby forming the horizontal/vertical interlacing pattern.

2. The pick-up device of claim 1, wherein the four times n holes are configured with equidistant spacing between the holes, and with uniform minimum distance from the holes to the lower end of the elongated ball container.

3. The pick-up device of claim 1, wherein n is three, such that there are 12 holes.

4. The pick-up device of claim 1, wherein the elongated hollow ball container further comprises:
 a. an attachment unit, further comprising:
  i. the ball valve mechanism, mounted in a lower opening of the attachment unit;
 b. an extension section;
 wherein the attachment unit is configured such that an upper end of the attachment unit has a has a greater diameter than a lower end of the extension section;
 such that the upper end of the attachment unit is configured to slide onto the lower end of the extension section, such that the attachment unit is firmly secured on the lower end of the extension section.

5. The pick-up device of claim 4, wherein the attachment unit further comprises a widening section at the upper end of the attachment unit;
 such that the widening section, has a greater diameter than the general diameter of the lower end of the attachment unit;
 such that the widening section of the attachment unit is configured to slide onto the lower end of the extension section, such that the attachment unit is firmly secured on the lower end of the extension section.

6. The pick-up device of claim 1, wherein the ball valve mechanism further comprises a plurality of springs, such that each spring is installed in a segment of the elastic string, between adjacent crossing points of the horizontal and vertical string segments, or between a crossing point and the elongated ball container, whereby the springs protect the elastic string.

* * * * *